(12) United States Patent
Kiuru et al.

(10) Patent No.: US 11,808,886 B2
(45) Date of Patent: Nov. 7, 2023

(54) MONITORING LIVING FACILITIES BY MULTICHANNEL RADAR

(71) Applicant: Teknologian tutkimuskeskus VTT Oy, Espoo (FI)

(72) Inventors: Tero Kiuru, Espoo (FI); Mervi Hirvonen, Espoo (FI); Mikko Metso, Espoo (FI)

(73) Assignee: Teknologian tutkimuskeskus VTT Oy, Espoo (FI)

( * ) Notice: Subject to any disclaimer, the term of this patent is extended or adjusted under 35 U.S.C. 154(b) by 283 days.

(21) Appl. No.: 17/045,540

(22) PCT Filed: Apr. 5, 2019

(86) PCT No.: PCT/FI2019/050274
§ 371 (c)(1),
(2) Date: Oct. 6, 2020

(87) PCT Pub. No.: WO2019/193256
PCT Pub. Date: Oct. 10, 2019

(65) Prior Publication Data
US 2021/0156962 A1 May 27, 2021

(30) Foreign Application Priority Data

Apr. 6, 2018 (FI) .................................. 20185325

(51) Int. Cl.
G01S 7/41 (2006.01)
G01S 7/292 (2006.01)
(Continued)

(52) U.S. Cl.
CPC ............ *G01S 7/415* (2013.01); *G01S 7/2925* (2013.01); *G01S 13/325* (2013.01);
(Continued)

(58) Field of Classification Search
CPC ...... G01S 13/325; G01S 13/426; G01S 13/48; G01S 13/5242; G01S 13/534;
(Continued)

(56) References Cited

U.S. PATENT DOCUMENTS 6,400,306 B1 * 6/2002 Nohara ................... G01S 13/87
342/25 R
7,916,066 B1 3/2011 Osterweil
(Continued)

FOREIGN PATENT DOCUMENTS

EP 2417908 A1 2/2012
WO WO2009055728 A1 4/2009
WO WO2012158840 A1 11/2012

Primary Examiner — Timothy X Pham
(74) Attorney, Agent, or Firm — Laine IP Oy

(57) ABSTRACT

According to an example aspect of the present invention, there is provided monitoring living facilities by a multichannel radar. A field of view within a frequency range from 1 to 1000 GHz, for example between 1 to 30 GHz, 10 to 30 GHz, 30 to 300 GHz or 300 to 1000 GHz, is scanned using a plurality of radar channels of the radar. Image units comprising at least amplitude and phase information are generated for a radar image on the basis of results of the scanning. Information indicating at least one error source of a physical movement of the radar and interrelated movements of targets within the field of view are determined on the basis of the image units. Results of the scanning are compensated on the basis of the determined error source. A radar image is generated on the basis of the compensated results.

19 Claims, 9 Drawing Sheets

(51) Int. Cl.
*G01S 13/32* (2006.01)
*G01S 13/42* (2006.01)
*G01S 13/48* (2006.01)
*G01S 13/524* (2006.01)
*G01S 13/534* (2006.01)
*G01S 13/89* (2006.01)
*G01S 13/88* (2006.01)

(52) U.S. Cl.
CPC ............ *G01S 13/426* (2013.01); *G01S 13/48* (2013.01); *G01S 13/5242* (2013.01); *G01S 13/534* (2013.01); *G01S 13/89* (2013.01); *G01S 7/417* (2013.01); *G01S 13/886* (2013.01)

(58) Field of Classification Search
CPC ...... G01S 13/536; G01S 13/886; G01S 13/89; G01S 7/2883; G01S 7/2925; G01S 7/356; G01S 7/40; G01S 7/415; G01S 7/417
See application file for complete search history.

(56) References Cited

U.S. PATENT DOCUMENTS

| | | | |
|---|---|---|---|
| 9,229,102 B1* | 1/2016 | Wright | G01S 13/885 |
| 2002/0140597 A1 | 10/2002 | Taylor et al. | |
| 2003/0210175 A1* | 11/2003 | Bickert | G01S 7/2927 342/162 |
| 2006/0028369 A1 | 2/2006 | Rausch et al. | |
| 2006/0170584 A1 | 8/2006 | Romero et al. | |
| 2006/0284757 A1* | 12/2006 | Zemany | G01S 13/32 342/28 |
| 2008/0165046 A1* | 7/2008 | Fullerton | G01S 7/003 342/21 |
| 2009/0262005 A1* | 10/2009 | McNeill | G01S 13/9029 342/28 |
| 2011/0025545 A1 | 2/2011 | Cook et al. | |
| 2013/0113647 A1 | 5/2013 | Sentelle et al. | |
| 2019/0195728 A1* | 6/2019 | Santra | G01M 5/0091 |
| 2019/0288366 A1* | 9/2019 | Kirino | G01S 13/345 |
| 2020/0400813 A1* | 12/2020 | Oishi | G01S 13/9027 |

* cited by examiner

MONITORING LIVING FACILITIES BY MULTICHANNEL RADAR

FIELD

The present invention relates to multichannel radars and monitoring living facilities by the multichannel radars.

BACKGROUND

Doppler and/or UWB impulse radar techniques are used for remote vital sign monitoring. These techniques provide measuring breathing of a person. However, these techniques operate in low microwave frequencies and therefore, their angular resolution is limited, particularly close to the radar such as indoors in living facilities. Improvement of the angular resolution by enlarging the antenna systems introduces limitations to use of the radar in indoor installations.

Reliability of the vital sign monitoring may be negatively affected by interference. The interference may cause that the vital sign monitoring may produce erroneous data and/or false alarms. Therefore, reliability of the vital sign monitoring is important to enable utilization of the data obtained by the vital sign monitoring.

SUMMARY OF THE INVENTION

The invention is defined by the features of the independent claims. Some specific embodiments are defined in the dependent claims.

According to a first aspect of the present invention, there is provided a method for monitoring living facilities by a multichannel radar, comprising:
  scanning, by a multichannel radar or at least one processing unit connected to the radar, a field of view within a frequency range from 1 to 1000 GHz, for example between 1 to 30 GHz, 10 to 30 GHz, 30 to 300 GHz or 300 to 1000 GHz, using a plurality of radar channels of the radar;
  generating, by the radar or the processing unit connected to the radar, image units for a radar image on the basis of results of the scanning, wherein the image units comprise at least amplitude and phase information;
  determining, by the radar or the processing unit connected to the radar, on the basis of the image units information indicating at least one error source of a physical movement of the radar and interrelated movements of targets within the field of view;
  compensating, by the radar or the processing unit connected to the radar, results of the scanning on the basis of the determined error source; and
  generating, by the radar or the processing unit connected to the radar, a radar image on the basis of the compensated results.

According to a second aspect of the present invention, there is provided a multichannel radar for monitoring living facilities, comprising:
  means for scanning a field of view within a frequency range from 1 to 1000 GHz, for example between 1 to 30 GHz, 10 to 30 GHz, 30 to 300 GHz or 300 to 1000 GHz, using a plurality of radar channels of the radar;
  means for generating image units for a radar image on the basis of results of the scanning, wherein the image units comprise at least amplitude and phase information;
  means for determining on the basis of the image units information indicating at least one error source of a physical movement of the radar and interrelated movements of targets within the field of view;
  means for compensating results of the scanning on the basis of the determined error source; and
  means for generating a radar image on the basis of the compensated results.

According to a third aspect of the present invention, there is provided an arrangement comprising a multichannel radar and a user interface operatively connected to the radar and a processor connected to the radar to cause a method according to an aspect, and: displaying at least one of the generated radar image, information indicating the number of moving targets, types of the moving targets, information indicating heart rate, information indicating breathing and information indicating a presence of error source.

According to a fourth aspect of the present invention, there is a computer program configured to cause, when executed by a multichannel radar or at least one processing unit connected to a multichannel radar, a method according to an aspect.

According to a fifth aspect of the present invention, there is provided a non-transitory computer readable medium having stored thereon a set of computer readable instructions that, when executed by a multichannel radar or at least one processor connected to a multichannel radar, cause the multichannel radar or the one processor and the multichannel radar to perform at least: scanning a field of view within a frequency range from 1 to 1000 GHz, for example between 1 to 30 GHz, 10 to 30 GHz, 30 to 300 GHz or 300 to 1000 GHz, using a plurality of radar channels of the radar, generating image units for a radar image on the basis of results of the scanning, wherein the image units comprise at least amplitude and phase information, determining on the basis of the image units information indicating at least one error source of a physical movement of the radar and interrelated movements of targets within the field of view, compensating results of the scanning on the basis of the determined error source; and generating a radar image on the basis of the compensated results.

EMBODIMENTS

Figure 1:
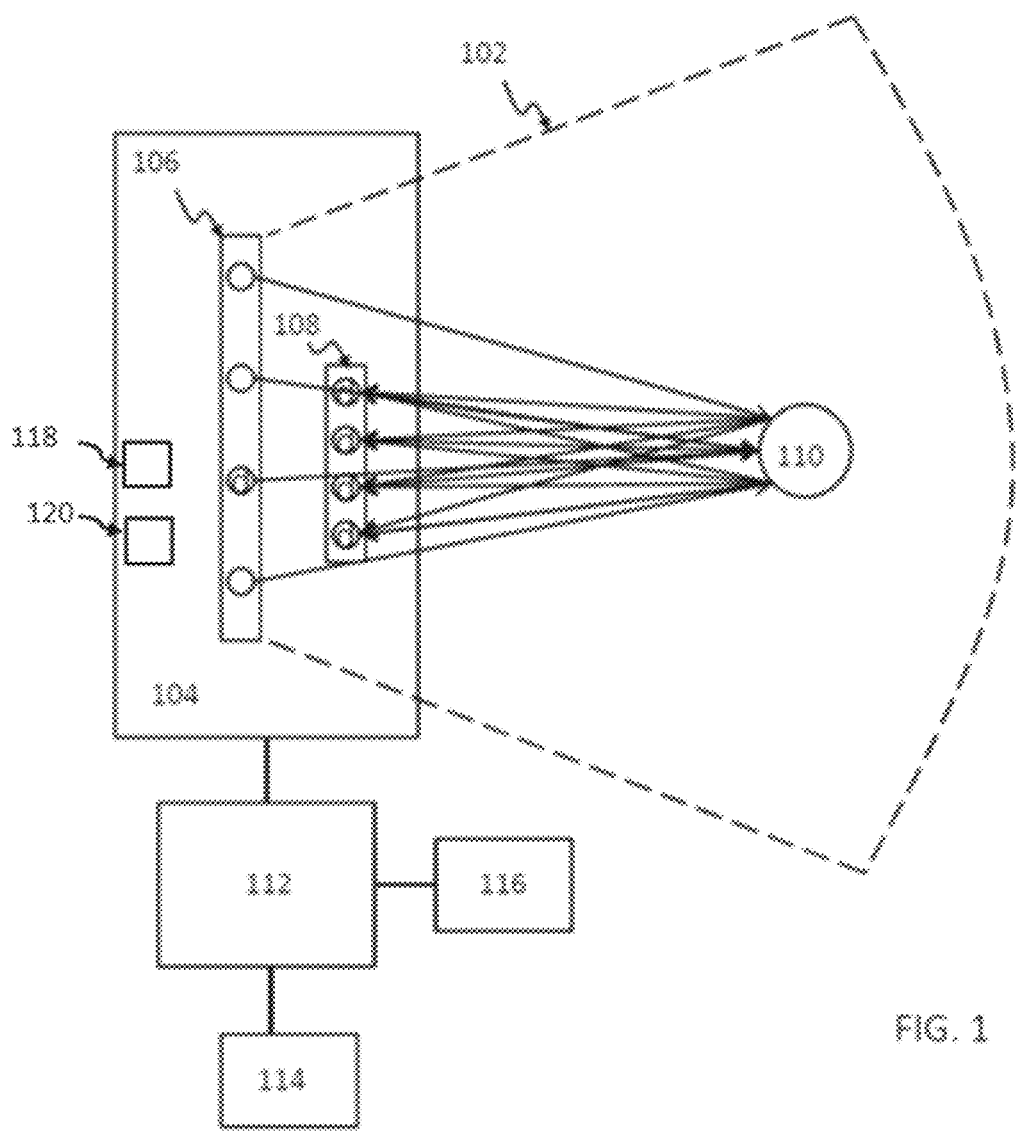
FIG. 1 illustrates an example of a multichannel radar in accordance with at least some embodiments of the present invention.

In the present context a multichannel radar may refer to a Multiple Input Multiple Output (MIMO) radar comprising a system of multiple transmitting antennas and multiple receiving antennas, a Multiple Input Single Output (MISO) radar comprising a system of multiple transmitting antennas and a single receiving antenna or a Single Input Multiple Output (SIMO) radar comprising a system of a single transmitting antenna and multiple receiving antennas. The transmitting antennas may be configured to radiate a signal waveform in a region of the electromagnetic spectrum independently of the other transmitting antennas. Each receiving antenna can receive these signals, when the transmitted signals are reflected back from a target in a field of view of the radar. The transmitted waveforms are distinguishable from each other such that they may be separated, when they are received by the receiving antennas.

In the present context living facilities refers to buildings and premises or their parts such as rooms, used by people and/or pets. Examples of the living facilities comprise offices, homes, home facilities, assisted living facilities, nursing homes and hospitals.

A radar channel is a combination of transmitting antenna and receiving antenna. A signal waveform transmitted by a multichannel radar comprising k transmitting antennas and n receiving antennas may be received via k×n radar channels. In an example, k=4 and n=8, whereby the number of radar channels becomes 32.

An active radar channel refers to a combination of transmit and receive antennas that are in use for transmitting and receiving operation.

A passive radar channel refers to a combination of transmit and receive antennas that are not in use for transmitting and receiving operation.

Scanning a field of view by multichannel radar refers to transmitting a signal waveform by transmitting antennas of the multichannel radar and receiving reflected copies of the transmitted signal waveform by receiving antennas of the multichannel radar. The scanning is performed by active radar channels. In this way results of the scanning comprising signal waveforms of all the active radar channels defined by the transmitting antennas and receiving antennas are obtained.

A moving target may refer to a target, for example a pet or a person, or a part of the target, that is moving.

A micro movement may be a movement of a part of the target, for example a movement of the chest by respiration or a movement of the chest by heartbeat.

An image unit refers to a point in a radar image that may be controlled to be displayed on a user interface. The imaging unit may be an image element, for example a pixel, in digital imaging.

Monitoring living facilities is provided by a multichannel radar, by scanning a field of view within a frequency range from 1 to 1000 GHz, for example between 1 to 30 GHz, 10 to 30 GHz, 30 to 300 GHz or 300 to 1000 GHz, using a plurality radar channels of the radar. Image units for a radar image are generated on the basis of results of the scanning. The image units comprise at least amplitude and phase information. Information indicating at least one error source of a physical movement of the radar and interrelated movements of targets within the field of view are determined on the basis of the image units. Results of the scanning are compensated on the basis of the determined error source, and a radar image is generated on the basis of the compensated results.

FIG. 1 illustrates an example of multichannel radar in accordance with at least some embodiments of the present invention. The multichannel radar 104 comprises a plurality transmitting antennas 106 and a plurality of receiving antennas 108 for scanning a field of view 102 of the radar for a presence of one or more targets 110 within the field of view by radar channels defined by combinations of the transmits and receive channels. The radar is configured to perform the scanning within a frequency range of 1 to 1000 GHz, for example between 1 to 30 GHz, 10 to 30 GHz, 30 to 300 GHz or 300 to 1000 GHz, whereby signal waveforms are transmitted by the transmitting antennas at a carrier frequency selected from the frequency range. The frequency range of 30 to 300 GHz or the higher frequency range of 300 to 1000 GHz may be preferred such that the radar may be configured to have dimensions suitable for indoor installations, while providing the radar to have a sufficient angular resolution. When a target is present within the field of view, transmitted signal waveforms are reflected from the target and received by the radar channels of the radar. Preferably, the scanning is performed using a number of radar channels that is sufficient for generating a radar image for determining presence of multiple moving targets within the living facilities. The number of radar channels affects resolution of the monitoring performed by the radar. For example 8 parallel radar channels may provide approximately a resolution of 14 degrees and 32 parallel radar channels may provide approximately a resolution of 3.5 degrees. In an example, 16 radar channels may be sufficient for monitoring a person that is walking. In an example the scanning may be performed between time intervals, whose duration may be determined based on the speed of movement of the moving targets. In a normal operation mode substantially all radar channels are active and used for scanning such that multiple moving targets may be identified from a radar image generated on the basis of results of the scanning. In a power saving operation mode a reduced number of radar channels are active, for example one active radar channel, and used for scanning such that a single moving target may be identified from a radar image generated on the basis of results of the scanning. In the power saving mode the time interval between scans may be reduced or increased for example with respect to the scanning interval, such as the scanning interval in the normal operation mode, used before entering the power saving mode. A target identified from the radar image may be determined to be a moving target based on phase and/or amplitude changes of the image units of the radar images generated based on scans.

In an example the radar may comprise 4 transmitting antennas and 8 receiving antennas, whereby 4×8=32 radar channels are available for scanning the field of view, when the radar is in a normal operation mode. At least part, for example 3 channels, of the radar channels may be reserved for calibration purposes, whereby the remaining channels, for example 29 channels, may be utilized for monitoring of moving targets by the radar. Accordingly, in this example the multichannel radar of 29 radar channels provides an angular resolution that is enhanced 29/8=3.625 times over a radar having a single transmitting antenna and a receiver array of 8 antennas.

In one application of the radar 104, the radar is used to monitoring targets such as people and/or pets within living facilities. Since the monitoring is based on a radar image rather than video or still images, the monitoring may be performed without compromising privacy of the people and/or the living facilities. This is particularly useful for monitoring in nursing, assisted living and home care applications.

In at least some embodiments, the radar may be connected to one or more processing units 112. The processing unit may be configured to receive at least one of results of scanning radar channels, a radar image generated on the basis of results of the scanning radar channels, information indicating image units in a radar image, and information indicating moving targets within the field of view of the radar. Alternatively or additionally, the processing unit may be connected to the radar to control the radar.

In an example a processing unit 112 may comprise a data processor and a memory. The memory may store a computer program comprising executable code for execution by the processing unit. The memory may be a non-transitory computer readable medium. The executable code may comprise a set of computer readable instructions.

In at least some embodiments, the radar and/or processing unit may be connected to a user interface 114 for obtaining input from a user. The input of the user may be used to control the radar and/or the processing unit for monitoring living facilities.

In an at least some embodiments, one or more of an accelerometer 118 and/or a gyroscope 120 may be installed to the radar such that corresponding data indicating a physical movement of the radar may be generated. The data may be generated by the accelerometer and the gyroscope in response to movement of the radar. The movement may be caused e.g. by vibrations of the installation surface of the radar. In this way information may be obtained from the physical movement of the radar such that the physical movement may be compensated in scanning results.

An embodiment concerns an arrangement comprising a multichannel radar 104 and a processor connected to the radar. The arrangement may be a sleep monitoring system or a monitoring system for nursing and/or home care. The arrangements may be caused to perform one or more functionalities described herein. Particularly, in nursing and home care it may be of paramount importance to identify situations, where a person is alone in living facilities such that the sleep, sleep apnea or a medical emergency may be detected.

An embodiment concerns an arrangement comprising a multichannel radar 104 and a user interface 114 operatively connected to the radar and a processor connected to the radar to cause: displaying at least one of the radar image, information indicating the number of moving targets, types of the moving targets, information indicating heart rate, information indicating breathing rate and information indicating a presence of error source. The arrangement provides monitoring of living facilities without compromising privacy. The displayed information may be obtained by performing a method in accordance with at least some embodiments.

In an embodiment, an arrangement may be caused to perform at least one of obtaining, by a user interface, user input to cause at least one of switching off compensation of the scanning results, and obtaining, by the user interface, user input for training an artificial intelligence system operatively connected to the radar and the processing unit to the compensated results.

An embodiment concerns use of an arrangement comprising a multichannel radar 104 and a user interface 114 operatively connected to the radar and a processor connected to the radar to cause a method according to an embodiment.

It should be appreciated that the user interface may also provide output to the user such. The output may provide that the user may be provided information for example results of scanning radar channels, a radar image generated on the basis of results of the scanning radar channels, information indicating image units in a radar image, and information indicating moving targets within the field of view of the radar. In this way the user may monitor operation of the radar and/or processing unit connected to the radar from a remote location.

Examples of the user interfaces comprise devices that may serve for providing output to the user and/or for obtaining input from the user, such as display devices, loudspeakers, buttons, keyboards and touch screens.

In at least some embodiments, the radar and/or processing unit may be connected to an artificial intelligence system 116. The artificial intelligence system may provide adaptation of the monitoring by the radar to the living facilities, where the radar is installed. Examples of the artificial intelligence system comprise computer systems comprising an artificial neural network. The artificial intelligence system may be configured by training the artificial neural network based on user input.

Figure 2A:
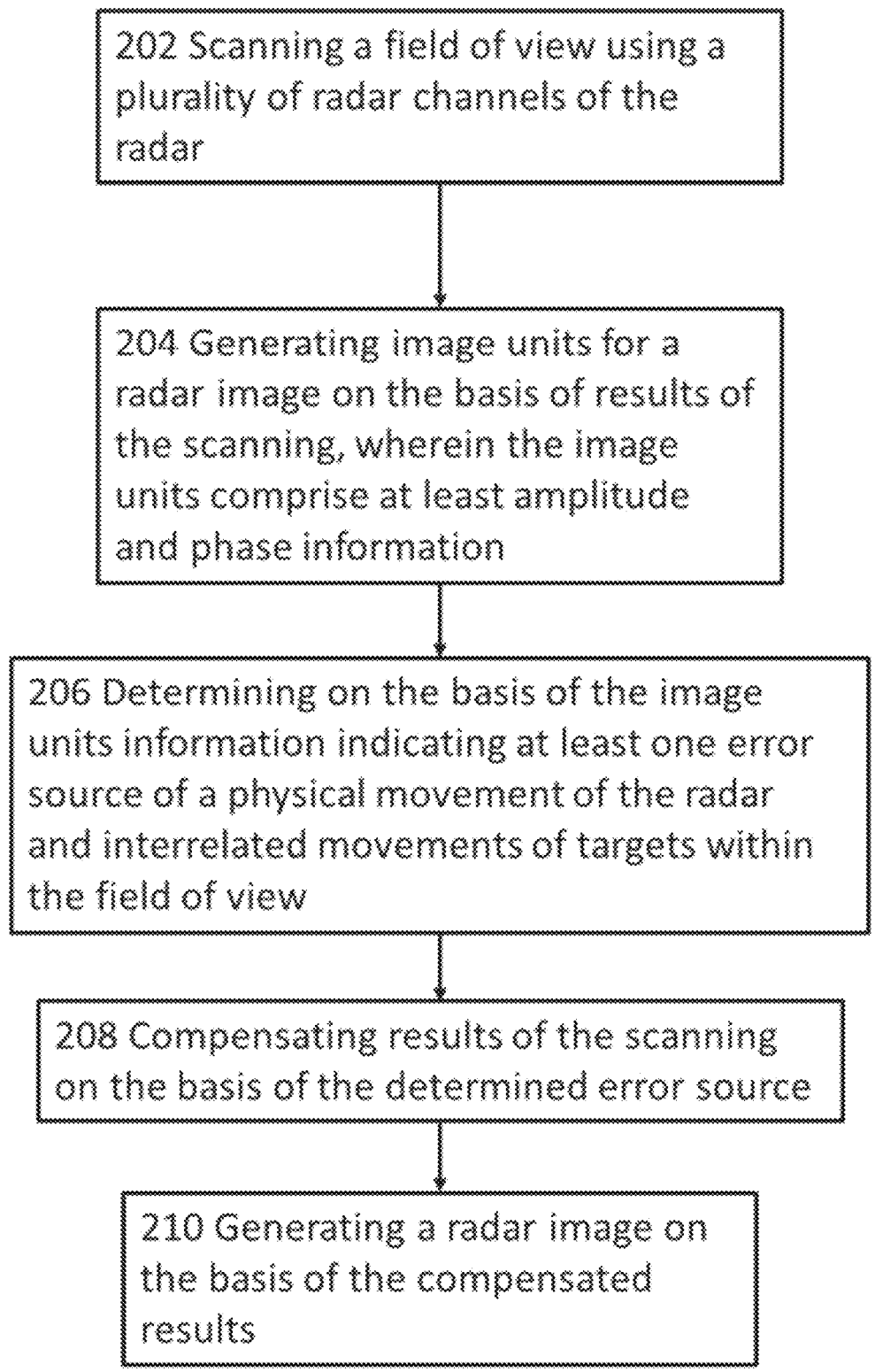
FIGS. 2A and 2B illustrate examples of methods in accordance with at least some embodiments of the present invention.
Figure 2B:
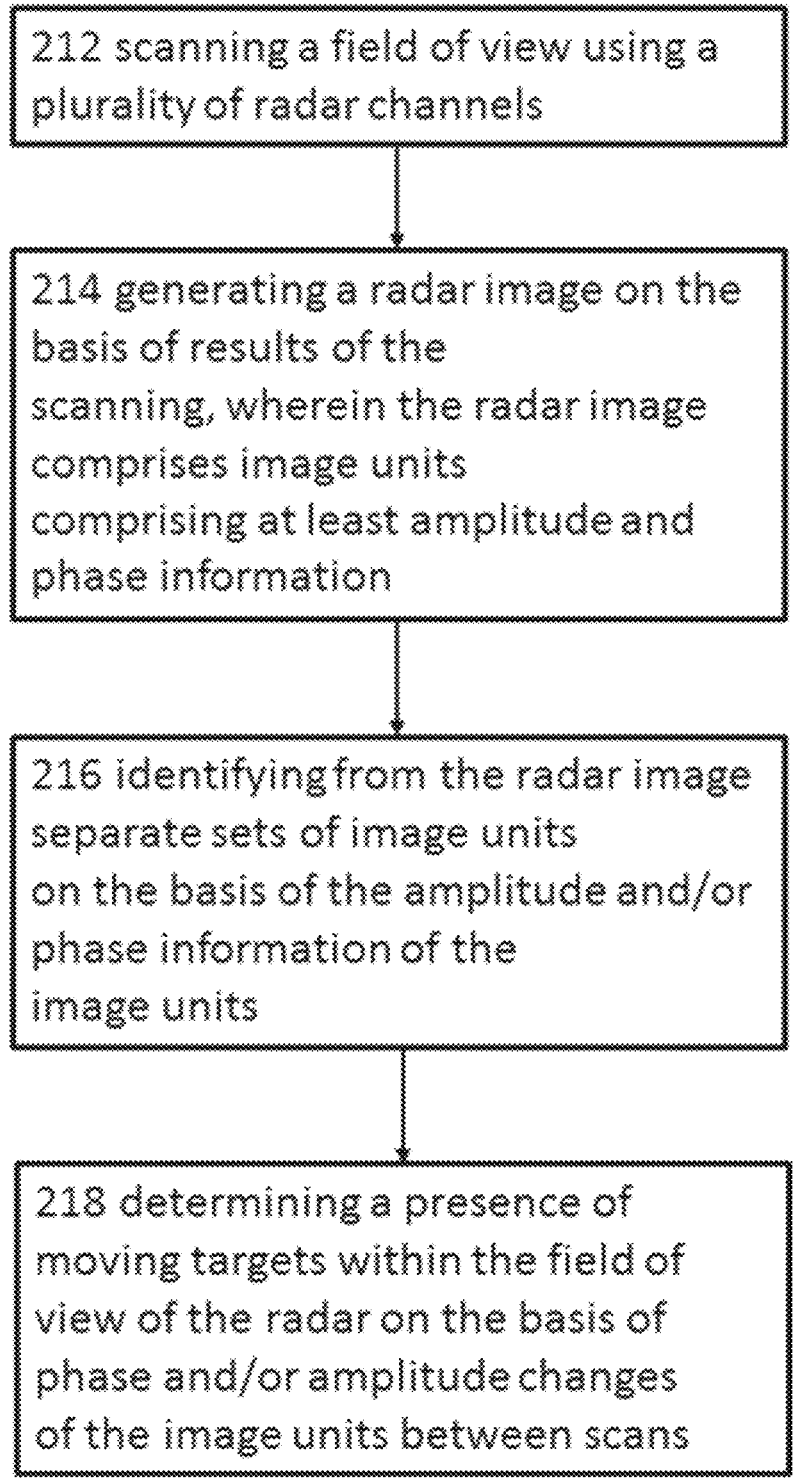

FIGS. 2A and 2B illustrate examples of method in accordance with at least some embodiments of the present invention. The methods may provide monitoring living facilities. The method may be performed by a multichannel radar or one or more processing units connected to a multichannel radar described with FIG. 1.

The method illustrated in FIG. 2A provides reliable monitoring of moving targets by a multichannel radar scanning a field of view within a frequency range from 1 to 1000 GHz, for example between 1 to 30 GHz, 10 to 30 GHz, 30 to 300 GHz or 300 to 1000 GHz.

Phase 202 comprises scanning, by the multichannel radar or the at least one processing unit connected to the radar, a field of view within a frequency range from 1 to 1000 GHz, for example between 1 to 30 GHz, 10 to 30 GHz, 30 to 300 GHz or 300 to 1000 GHz, using a plurality of radar channels of the radar.

Phase 204 comprises generating, by the radar or the processing unit connected to the radar, image units for a radar image on the basis of results of the scanning, wherein the image units comprise at least amplitude and phase information.

Phase 206 comprises determining, by the radar or the processing unit connected to the radar, on the basis of the image units information indicating at least one error source of a physical movement of the radar and interrelated movements of targets within the field of view.

Phase 208 comprises compensating, by the radar or the processing unit connected to the radar, results of the scanning on the basis of the determined error source.

Phase 210 comprises generating, by the radar or the processing unit connected to the radar, a radar image on the basis of the compensated results.

In an example a physical movement of the radar may comprise a movement caused by vibrations of the installation surface of the radar.

In an example phase 206 may comprise determining a type of the error source on the basis of changes of image units corresponding to moving targets between scans, changes of image units corresponding to non-moving targets between scans, accelerometer data and/or gyroscope data. The image units may be generated based on the scanning results, whereby changes of the image units may be observed between the scans.

Figure 6:
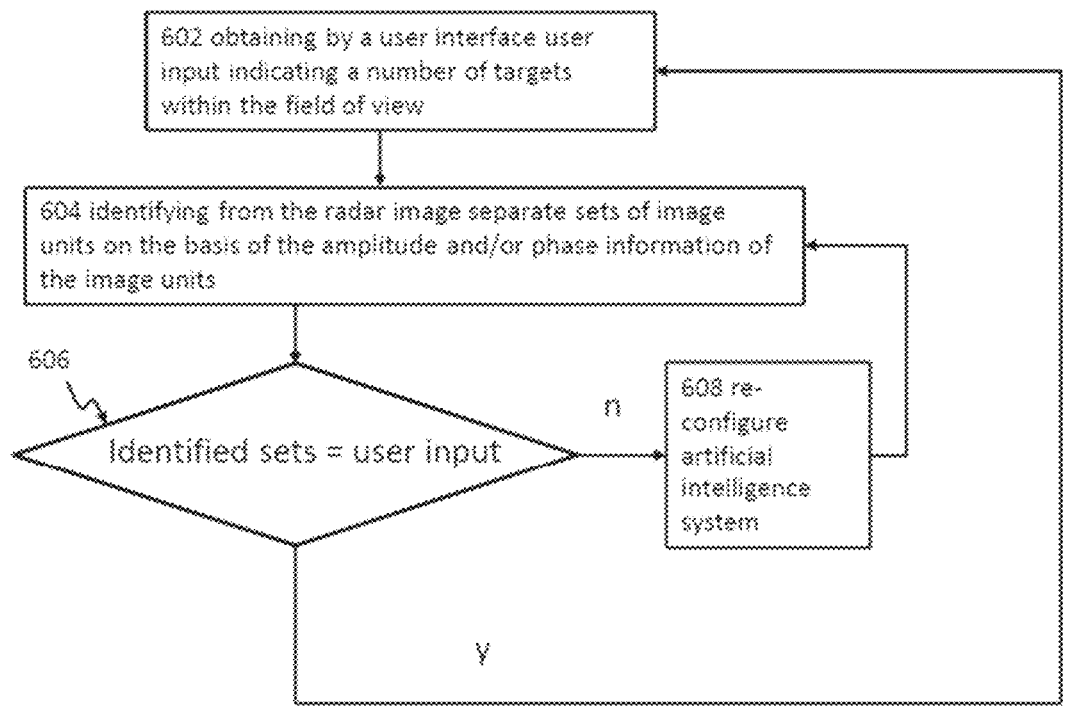
FIG. 6 illustrates configuring an artificial intelligence system in accordance with at least some embodiments of the present invention.

It should be appreciated that the image units corresponding to non-moving targets and/or moving targets may be determined at deployment of the radar, by human input and/or by an artificial intelligence system trained for identifying image units corresponding to targets for example in accordance with FIG. 6. The changes of the image units between scans may be determined by observing the phases and/or amplitudes of the image units.

In an example, phase 208 comprises applying, e.g. by adding or subtracting, all radar channels a time delay or frequency shift corresponding to a physical movement of the radar. Whether the time delay or frequency shift is applied depends on the type of the radar. When the radar is a Frequency-modulated continuous-wave radar, the frequency shift may be applied to all radar channels. In this way the radar image may be In an embodiment, phase 206 comprises determining the physical movement of the radar on the basis of changes of image units corresponding to non-moving targets between scans, accelerometer data and gyroscope data. The accelerator and the gyroscope may generate corresponding data indicating a physical movement of the radar, whereby the physical movement of the radar may be determined more accurately.

The method illustrated in FIG. 2B provides determining a presence of moving targets within a field of view of a multichannel radar scanning a field of view within a frequency range from 1 to 1000 GHz, for example between 1 to 30 GHz, 10 to 30 GHz, 30 to 300 GHz or 300 to 1000 GHz.

Phase 212 comprises scanning, by the multichannel radar or at least one processing unit connected to the radar, a field of view within a frequency range from 1 to 1000 GHz, for example between 1 to 30 GHz, 10 to 30 GHz, 30 to 300 GHz or 300 to 1000 GHz, using a plurality of radar channels of the radar. Phase 214 comprises generating, by the radar or the processing unit connected to the radar, a radar image on the basis of results of the scanning, wherein the radar image comprises image units comprising at least amplitude and phase information. Phase 216 comprises identifying from the radar image, by the radar or the processing unit connected to the radar, separate sets of image units on the basis of the amplitude and/or phase information of the image units. Phase 218 comprises determining, by the radar or the processing unit connected to the radar, a presence of moving targets within the field of view of the radar on the basis of phase and/or amplitude changes of the image units between scans. The movement of the targets is reflected in the amplitude and/or phase of the scans, whereby the targets may be determined as moving targets.

An embodiment concerns a method for reliable monitoring of moving targets in accordance with the method of FIG. 2A. The method may comprise identifying from the radar image, by the radar or the processing unit connected to the radar, separate sets of image units on the basis of the amplitude and/or phase information of the image units, in accordance with phase 216, and determining, by the radar or the processing unit connected to the radar, a presence of moving targets within the field of view of the radar on the basis of phase and/or amplitude changes of the image units between scans, in accordance with phase 218.

An embodiment concerns a method for determining a presence of moving targets within a field of view of a multichannel radar scanning a field of view within a frequency range from 1 to 1000 GHz, for example between 1 to 30 GHz, 10 to 30 GHz, 30 to 300 GHz or 300 to 1000 GHz, in accordance with the method of FIG. 2B. Phase 214 may comprise generating, by the radar or the processing unit connected to the radar, a radar image on the basis of the compensated results, in accordance with phase 210 of FIG. 2A. The compensated results may be obtained by performing phases 206 and 208. The radar image generated based on the compensated results in accordance with phase 210 provides reliability in determining the presence of moving targets.

Accordingly, it should be appreciated an embodiment may comprise one or more phases of the methods of FIGS. 2A and 2B such that presence of moving targets may be determined in a reliable manner.

It should be appreciated that the scanning in phase 212 may be performed using signal waveforms transmitted at a carrier frequency selected from a frequency range of 1 to 1000 GHz, for example between 1 to 30 GHz, 10 to 30 GHz, 30 to 300 GHz or 300 to 1000 GHz. However, the frequency range of 30 to 300 GHz may be preferred such that the radar may be configured to have dimensions suitable for indoor installations, while providing the radar to have a sufficient angular resolution.

In an example of determining a presence of moving targets, fluctuations of the phase together with relatively small changes of amplitude of the image units between scans may indicate a micro movement, for example breathing. At the same time image units that surround the image units that have the fluctuations may be substantially constant between scans.

In an example of determining a presence of moving targets, fluctuations of the amplitude of the image units between scans may indicate large movements the targets, for example a walking person.

In an example of determining a presence of moving targets, periodical changes of the phase together with relatively small changes of the amplitude may indicate micro movements, such as breathing, hear rate, during which the moving target, such as a person may be asleep or at rest.

It should be appreciated a calibration may be performed for determining a presence of moving targets. An initial calibration may be performed by scanning the field of view that does not include moving targets. The calibration facilitates determining presence of moving targets, when they enter the field of view of the radar. One or more further calibrations may be performed, when it is determined that there are no moving targets in the field of view of the radar such that the calibration of the radar may be maintained during the monitoring of the living space.

At least in some embodiments an image unit of a radar image may comprise a range, an azimuth angle, an elevation angle, phase and/or amplitude. The changes of the phase and/or amplitude provide identifying image units to correspond to a moving target. The range and azimuth provide together with the phase and amplitude a 2D radar image. The elevation of the image units provide together with range, azimuth provide, phase and amplitude, a three dimensional (3D) radar image.

An example of phase 212 comprises that the field of view of the radar is populated by several antenna beams of the transmitting antennas by using digital Fast Fourier Transform (FFT) beamforming and virtual antenna algorithms. The several antenna beams carry signal waveforms transmitted by the transmitting antennas at a frequency within the range 1 to 1000 GHz, for example between 1 to 30 GHz, 10 to 30 GHz, 30 to 300 GHz or 300 to 1000 GHz.

An example of phase 214 comprises constructing image units by processing received signals of the radar channels using FFT algorithms and/or correlation algorithms from received signals of the radar channels. One FFT algorithm may be used to derive range, amplitude and phase information from time domain signals received on the radar channels, when the radar is Frequency-modulated continuous-wave radar. When the radar is a coded waveform radar, the correlation algorithms may be used to derive range, amplitude and phase information from time domain signals received on the radar channels. One or more further FFT algorithms may be used for retrieving azimuth and/or elevation angles.

An example of phase 216 comprises processing the radar image by one or more peak search algorithms. Radar images generated based in different scans may be processed to identify separate sets of image units in each radar image for determining phase and/or amplitude changes for determining presence of moving targets in phase 218. It should be appreciated scanning may be performed at a suitable scanning interval to identify separate sets of image units from radar images. Life signs like hear rate and breathing can be further separated by determining and following their change patterns. Further, pets and humans or children and adults, or individuals, can be separated by artificial intelligence or by wearing identification tags that modulate the reflected radar signal or send their own signal.

An example of phase 218 comprises observing the amplitude and/or phase of the target over a time interval. The target may correspond to a separate set of image units identified in phase 216. A single radar image may be considered a snapshot in time, whereby observing image units of the targets over more than one radar images may be used to determine that the targets are moving, when the image units are moved in the radar image.

An example of phase 218 comprises that each separate set determined in phase 216 may be considered a target and the target may be determined to be a moving target on the basis of phase and/or amplitude changes of the image units of corresponding to the target between scans.

In an embodiment, the image units of the radar image further comprise range, azimuth angle and/or elevation angle. In this way separating targets from another and detecting movement of the targets may be performed more accurately.

In an embodiment, phase 216 comprises determining image units belonging to separate sets by grouping the image units on the basis of at least one of: range of the image units; azimuth angle of the image units; elevation angle of the image units; and phase and/or amplitude changes between of the image units between the scans.

Figure 3:
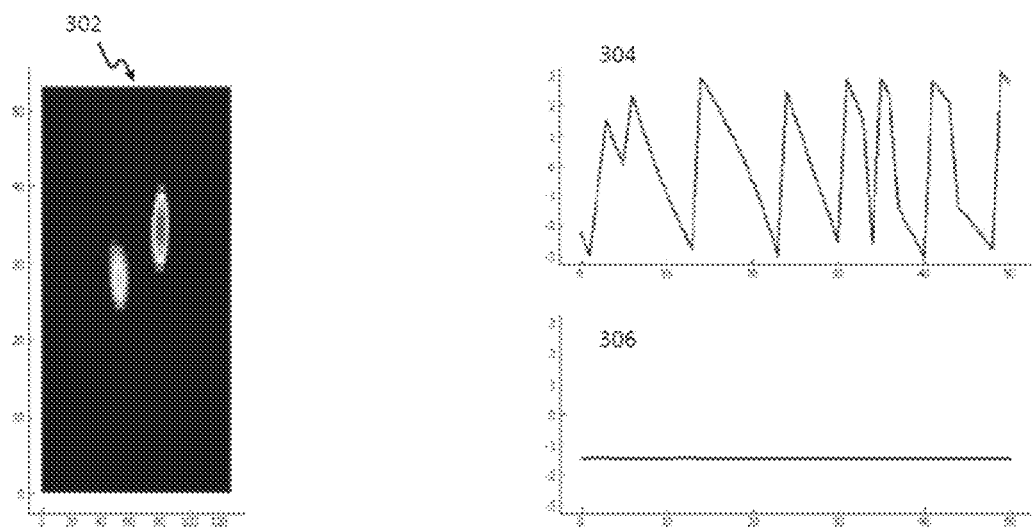
FIG. 3 illustrates an example of a radar image in accordance with at least some embodiments of the present invention.

FIG. 3 illustrates an example of a radar image in accordance with at least some embodiments of the present invention. The radar image may be obtained by the method described with FIG. 2B. The reliability of the radar image may be improved by the phases of the method described with FIG. 2A. In an example the radar image may be a two dimensional (2D) map of the field of view of the radar displayed on a graphical user interface. The radar image may comprise an amplitude plot 302 illustrating amplitude values of image units in the field of view of the radar. The radar image may further comprise a phase plot 304, 306 illustrating phase changes between scans. The amplitude plot comprises two separate sets of image units. The sets may be determined on the basis of areas around one or more image units having peak values for amplitude. The phase plot may comprise one phase plot 304 for the set of image units on the left side of the of the amplitude plot. The phase plot may further comprise another phase plot 306 for the set of image units on the right side of the of the amplitude plot. It should be appreciated that each moving target that is detected may be represented by a corresponding phase plot for easy monitoring of the targets. The image units on the left side of the of the amplitude plot may be determined to comprise image units corresponding to a moving target on the basis of phase changes of the phase plot 304. For example, the phase changes between consecutive scans may be determined to exceed a threshold value for determining the image units to comprise image units corresponding to a moving target. On the other hand, the image units on the right side of the of the amplitude plot may be determined not to comprise image units corresponding to a moving target on the basis of phase changes of the phase plot 306. For example, the phase changes between consecutive scans may be determined to be less than the threshold value for determining the image units to comprise image units corresponding to a moving target. Accordingly, in the illustrated example, the number of moving targets may be determined to be one.

Figure 4:
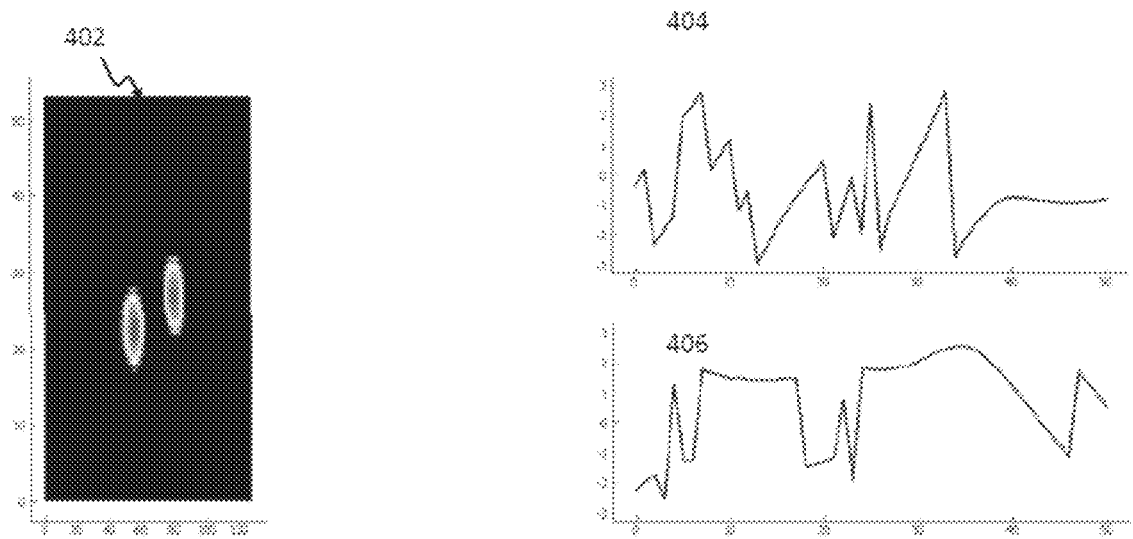
FIG. 4 illustrates an example of a radar image in accordance with at least some embodiments of the present invention.

FIG. 4 illustrates an example of a radar image in accordance with at least some embodiments of the present invention. The radar image may be obtained by the method described with FIG. 2B. The reliability of the radar image may be improved by the phases of the method described with FIG. 2A. In an example the radar image may be a two dimensional (2D) map of the field of view of the radar displayed on a graphical user interface. The radar image may comprise an amplitude plot 402 illustrating amplitude values of image units in the field of view of the radar. The radar image may further comprise a phase plot 404, 406 illustrating phase changes between scans. The amplitude plot comprises two separate sets of image units. The sets may be determined on the basis of areas around one or more image units having peak values for amplitude. The phase plot may comprise one phase plot 404 for the set of image units on the left side of the of the amplitude plot. The phase plot may comprise another phase plot 406 for the set of image units on the right side of the of the amplitude plot. It should be appreciated that each moving target that is detected may be represented by a corresponding phase plot for easy monitoring of the targets. The image units on the left and right side of the of the amplitude plot may be determined to comprise image units corresponding to moving targets on the basis of phase changes of the phase plots 404, 406. For example, the phase changes between consecutive scans may be determined to exceed a threshold value for determining the image units to comprise image units corresponding to a moving target. Accordingly, in the illustrated example, the number of moving targets may be determined to be two.

Figure 5:
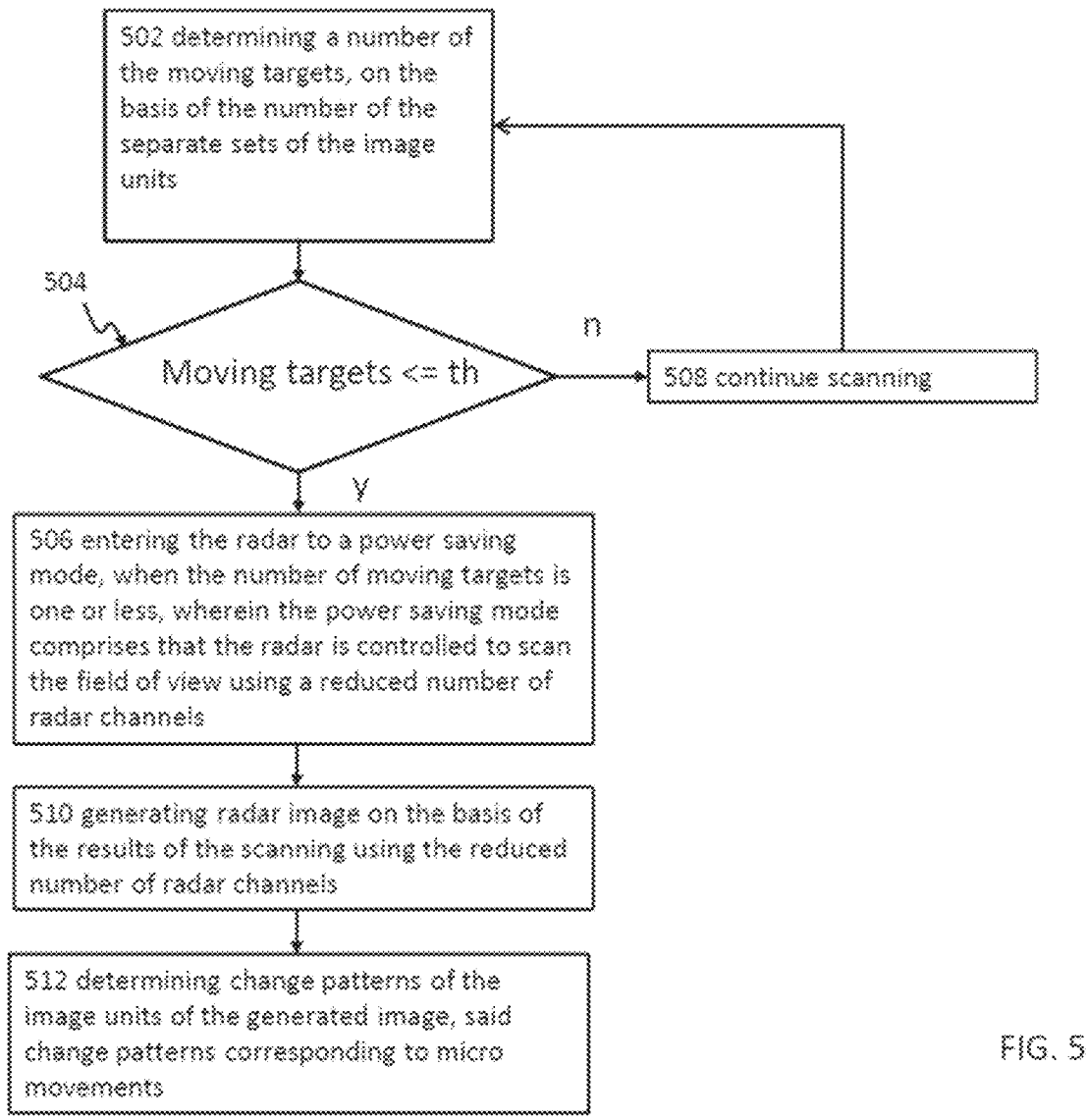
FIG. 5 illustrates an example of a method for controlling a multichannel radar in accordance with at least some embodiments of the present invention.

FIG. 5 illustrates an example of a method for controlling a multichannel radar in accordance with at least some embodiments of the present invention. The method may provide power saving in monitoring living facilities by the multichannel radar. The method may be performed by the multichannel radar or one or more processing units connected to the multichannel radar described with FIG. 1, when a radar image has been generated by scanning a field of view of the radar and a presence of one or more moving targets has been determined in accordance with the method of FIG. 2B. The reliability of the determining the presence of moving targets may be improved by the phases of the method described with FIG. 2A.

Phase 502 comprises determining a number of the moving targets, on the basis of the number of the separate sets of the image units. Phase 504 comprises determining whether the number of the moving targets is less than equal to a threshold value, for example an integer value such as one. Phase 506 comprises entering the radar to a power saving mode, when the number of moving targets is less than equal to the threshold value, wherein the power saving mode comprises that the radar is controlled to scan the field of view using a reduced number of radar channels, for example one radar channel. Accordingly, in the power saving mode only one radar channel may be active and the other radar channels may be passive. In this way, the field of view may be scanned with a shorter time period between consecutive scans than when a higher number of radar channels, e.g. all radar channels or substantially all radar channels, were used for scanning. The shorter time period between the scans provides that micro movements of the target within the field of view may be monitored by the radar more accurately. A micro movement may be a movement of a part of the target, for example a movement of the chest by respiration and a movement of the chest by heartbeat.

In an example of phase 502, each separate set may be considered a target and the target may be determined to be a moving target on the basis of phase and/or amplitude changes of the image units of corresponding to the target between scans, in accordance with phase 218 of FIG. 2B.

On the other hand, when it is determined that the number of moving targets is not less than equal to the threshold value, phase 508 is performed, where scanning the field of view of the radar is continued by performing one or more scans by a number of radar channels that is sufficient for generating a radar image for determining presence of multiple moving targets within the living facilities, for example in a normal operation mode of the radar. After one or more scans have been performed in phase 508, the phase 502 may be performed anew.

In an embodiment, in the power saving mode change patterns of the image units corresponding to micro movements such as at least one of heart rate and breathing are determined. In this way the condition of the monitored target such as breathing and/or heart rate may be followed more accurately. The change patterns may be determined by phases 510 and 512. Phase 510 comprises generating a radar image on the basis of the results of the scanning using the reduced number of radar channels in the power saving mode. Phase 512 comprises determining change patterns of the image units of the generated image, said change patterns corresponding to micro movements such as at least one of heart rate and breathing. The change patterns of the micro movements such as heart rate and breathing may be used to determine information indicating a rate, e.g. heart rate and/or breathing rate which may be displayed on a user interface.

In an embodiment, the radar is triggered to leave the power saving mode after a time interval has passed and/or on the basis of a trigger signal. In this way the phases 502 and 504 may be performed anew such that detecting a change in the presence of moving targets may be facilitated. When the power saving mode is left, the radar may be caused to enter another operation mode, for example the operation mode of the radar prior to entering the power saving mode, such as a normal operation mode.

In an example the radar is triggered after 1 to 10 s time period in the power saving mode to leave the power saving mode. The power saving mode may be returned by performing the phases 502, 504 and 506, after which the radar may be triggered to leave the power saving mode again. In another example the radar is triggered to leave the power saving mode by a trigger signal. The trigger signal may be information derived from a radar image, such as image units. Examples of the trigger signal comprise a rate of micro movements such as a heart rate and breathing rate. The rate of micro movement may be evaluated against a threshold to determine the rate as a trigger signal. For example a heart rate or breathing rate exceeding a threshold or less than a threshold may be used for a trigger signal.

Further examples of triggers for the radar to leave the power saving mode comprise, when the measurements indicate that a person gets up from bed, when more than one people are detected in the field of view, when data obtained by the measurements is unclear.

It should be appreciated that after the power saving mode has been entered in phase 506, the power saving mode may be changed to another operation mode, for example to a normal operation mode, where a higher number of radar channels, for example substantially all radar channels, are used for scanning. The operation mode may be changed, for example when a time interval has been elapsed. Said another operation mode may be the operation mode of the radar that preceded the radar entering the power saving mode. When the radar is not in the power saving mode, the power saving mode may be again entered in accordance with phases 502 and 504.

FIG. 6 illustrates identifying image units corresponding to targets by an artificial intelligence system in accordance with at least some embodiments of the present invention. The method may be performed by a multichannel radar or one or more processing units connected to a multichannel radar that are connected to an artificial intelligence system and a user interface described with FIG. 1. The artificial intelligence system may have an initial configuration that provides at least identifying from a radar image separate sets of image units on the basis of the amplitude and/or phase information of the image units. It should be appreciated that in addition to identifying from a radar image separate sets of image units, the artificial intelligence system may be in principle used to detect any occurrence of previously undetetected patterns, e.g. "fingerprints". Also other information of the image units such as range, azimuth angle, elevation angle, and phase and/or amplitude changes between of the image units between the scans may be used by the artificial intelligence system for the identifying. The initial configuration may be received by user input or the initial configuration may be predefined to a configuration of the artificial intelligence system. The method may provide that monitoring is adapted to the living facilities, where the radar is installed. The method may be performed, when a radar image has been generated by scanning a field of view of the radar in accordance with the method of FIG. 2B, for example during a training phase of the artificial intelligence system. The reliability of the radar image may be improved by the phases of the method described with FIG. 2A. After the training phase is complete, the artificial intelligence system is configured to support the monitoring of the living facilities by the radar by identifying a number of targets within a radar image.

Phase 602 comprises obtaining by the user interface user input indicating a number of targets within the field of view. Phases 604 and 606 provide determining by the artificial intelligence system a correspondence between separate sets of image units of the radar image and the number of targets within the field of view indicated by the user input. Phase 604 comprises identifying, by the artificial intelligence system, from the radar image separate sets of image units on the basis of the amplitude and/or phase information of the image units, in accordance with phase 216 of FIG. 2B. Phase 606 comprises determining whether a number of the separate sets identified in Phase 604 correspond with the number of targets within the field of view indicated by the user input. Phase 606 may provide data indicating a result of determining the correspondence. The data may be utilized in teaching the artificial intelligence system in a supervised learning method.

When the correspondence is determined, thus the result of phase 606 is positive, the artificial intelligence system is capable, using its current configuration, of identifying separate sets of image units corresponding to targets, and the method proceeds from phase 606 to phase 602 to obtain further input from the user and to identify sets of image units from a new radar image in phase 604. When the correspondence is not determined, thus the result of phase 606 is negative, the method proceeds from phase 606 to phase 608 to re-configure the artificial intelligence system and to phase 604, where the artificial intelligence system is used to perform identification of the separate sets using the new configuration determined in phase 608. In this way the new configuration of the artificial intelligence system may provide in phase 604 a new result that may be evaluated against the user input in phase 606. In this way, a configuration of the artificial intelligence system may be determined that provides identifying of separate sets corresponding to targets in the field of view.

It should be appreciated that the phases 602, 604, 606 and 608 may be repeated until the correspondence between separate sets of image units of radar images and the number of targets within the field of view indicated by the user input is obtained with sufficient certainty. In an example, the sufficient certainty may be determined based on a relationship of positive results and negative results determined in phase 606, when multiple radar images are processed by the phases 602 to 608. When the relationship is 99% of positive results it may be determined that the configuration of the artificial intelligence system has been adapted for monitoring the living facilities, where the radar is installed and the artificial intelligence system is configured to support the monitoring of the living facilities by the radar. After the sufficient certainty has been achieved the artificial intelligence system may identify image units corresponding to targets from the radar image, for example in phase 216.

At least some embodiments comprise a plurality of types of moving targets. Examples of the types comprise pets, humans, children and/or adults, and a type of target is defined by one or more patterns, and the separate sets of the image units are compared to the types of targets for identifying the separate sets to one or more of the types of the moving targets.

An embodiment concerns a method for identifying image units corresponding to a specific type of targets by an artificial intelligence system. Accordingly, the artificial intelligence system may be configured to support monitoring of the living facilities by a multichannel radar by identifying a number of targets of the specific type within a radar image. Types of the targets may comprise pets, humans, children and/or adults. The method may be performed in accordance with the method described with FIG. 6 with the difference that phase 602 comprises obtaining by the user interface user input indicating a number of targets of the specific type within the field of view. Accordingly, the method may applied for identifying image units corresponding to any of the types based on obtaining input from the user indicating the number of the specific type of targets. One type of targets should be selected for the method at time to facilitate obtaining a configuration of the artificial intelligence system capable of identifying separate sets of image units corresponding to targets of the specific type.

Figure 7:
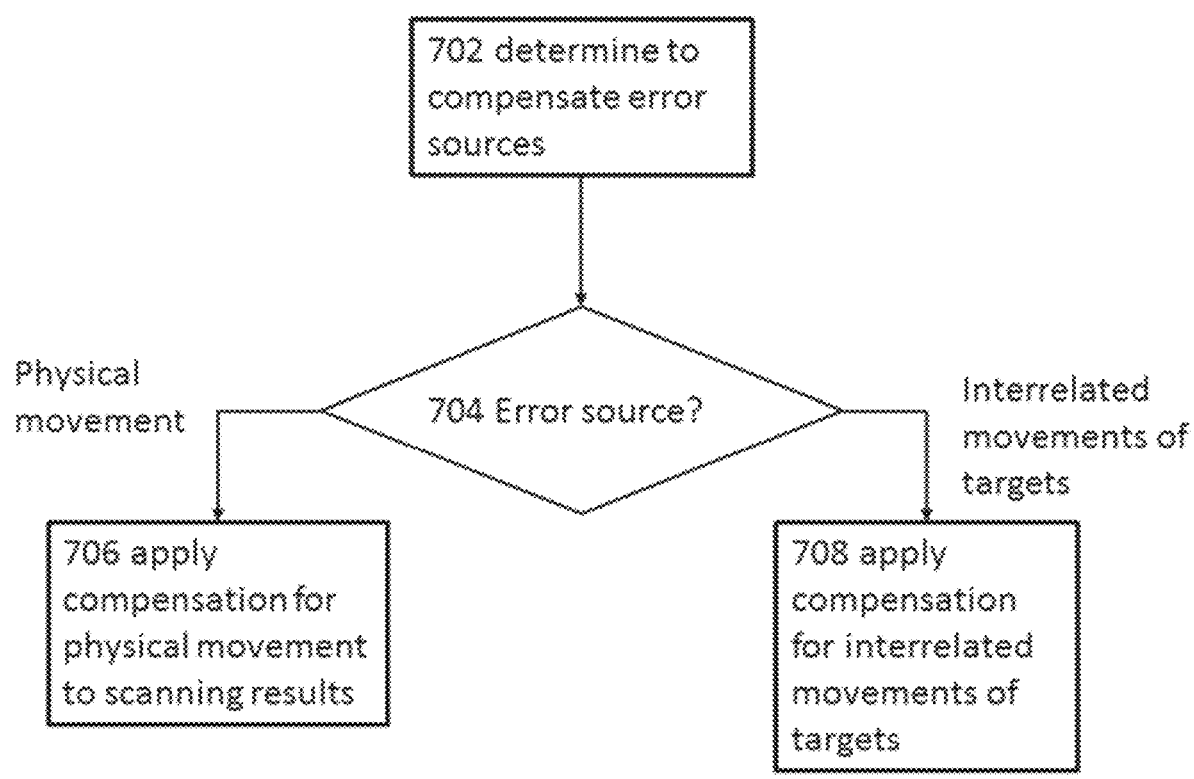
FIG. 7 illustrates compensating on the basis of the determined error source in accordance with at least some embodiments of the present invention.

FIG. 7 illustrates compensating on the basis of the determined error source in accordance with at least some embodiments of the present invention. The method may be performed by the multichannel radar or one or more processing units connected to the multichannel radar described with FIG. 1 in connection with the method of FIG. 2A providing reliability for monitoring living facilities for example in phase 208.

Phase 702 comprises determining to compensate error sources in monitoring living facilities by a multichannel radar. The error sources may be determined to be compensated by default or a need for compensating error sources. The need may be determined on the basis of abnormal movements of one or more moving targets within the field of view of the radar. The abnormal movements may be determined based on image units corresponding to the moving targets in the field of view of the radar. In an example the movements may be determined on the basis of changes of image units corresponding to moving targets, non-moving targets between scans, accelerometer data and/or gyroscope data.

In an example abnormal movements may comprise abnormal micro movements, such as heart rate or breathing rate. Abnormal heart rate and breathing rate may be for example micro movements that cross a threshold value for the micro movement, The threshold value may be set to indicate a change in the medical condition of the monitored target such as a human being and/or to indicate micro movements that do not correspond to a known medical condition of the monitored target. In a further example, the abnormal movement may comprise that two or more, or even all, targets in the field of view start moving after being static. This situation may occur when two people are sleeping in the same bed and then one of them moves, which causes the bed to "move" a little bit and then causing the other person to move because of this. In a yet further example, the abnormal movement may comprise movement of two or more, or even all, targets in the field of view in connection with an increase in the number of targets in the field of view. This situation may occur, when a pet jumps on the bed where two people are sleeping and causes movement of the bed and consequently movement of the people. In a further example, the abnormal movement may be caused by a physical movement of the radar, which may be caused by movement of the installation position of the radar, whereby also the radar is moved. This movement of the radar may be caused, when someone is jumping in the upper floor of the room in which the radar is mounted.

Phase 704 comprises determining a type of error source to be compensated. The type of the error source may be a physical movement of the radar or interrelated movements of targets within the field of view. The interrelated movements of targets within the field of view may be caused by a movement of at least one target in the field of view being communicated into a movement of one or more other targets in the field of view, for example as explained above in the examples, where the movement of the pet/one sleeping person is communicated by the bed to other targets. The type of the error source may be resolved on the basis of temporal signal properties of the radar channels. In an example changes of phases and/or amplitudes of the image units between scans may be used to determine the type of the error source.

Phase 706 comprises applying compensation for a physical movement of the radar to scanning results of the radar channels. After the compensation is applied to the scanning results, compensated scanning results are obtained such that the error source are compensated in the resulting radar image generated in accordance with phase 210 in FIG. 2A.

In an example, if the physical movement movement/ vibration of the radar is steady, the movement may be compensated accordingly in received radar channel signals before digital beamforming and target finding.

A radial movement may be compensated by applying, e.g. adding or subtracting, a time delay or a phase offset corresponding to the movement of the radar to received signals in all radar channels. Whether a time delay or a phase offset is applied may be determined based on the type of the radar. For example, when the radar is a Frequency-modulated continuous-wave radar, the frequency shift may be applied.

A tangential movement in azimuth or elevation angle may be compensated by altering phase differences between the radar channels accordingly.

Phase 708 comprises applying compensation for interrelated movements of targets within the field of view to scanning results. In an example, the compensation of the interrelated movements may be performed similar to described above for the physical movement of the radar in connection with phase 706. Moreover, the compensation may comprise that a time period of scanning results affected by the error source is ignored. In this way only scanning results that are not affected by the error source may be utilized in the monitoring. After the compensation is applied to the scanning results, compensated scanning results are obtained such that the error source is compensated in the resulting radar image generated in accordance with phase 210 in FIG. 2A.

In an embodiment, when the type of the error source is determined in phase 704 as a physical movement of the radar or interrelated movements of targets, it may be determined that there is an error source present in monitoring the living facilities by the radar and information indicating the presence of the error source may be displayed. In this way a user may obtain information of the presence of the error source and that the radar image is generated based on the compensated scanning results.

In an embodiment, when the user is displayed information indicating that an error source is present, the compensation may be adjusted by the user. The compensation may be switched off and/or the user may enter user input for training an artificial intelligence system in accordance with phase 602 of the FIG. 6. Switching off the compensation provides that the user may be displayed a radar image that is not compensated. Entering user input for training the artificial intelligence system provides that the operation of the artificial intelligence system on radar images generated on the basis of the compensated results may be improved.

Figure 8:
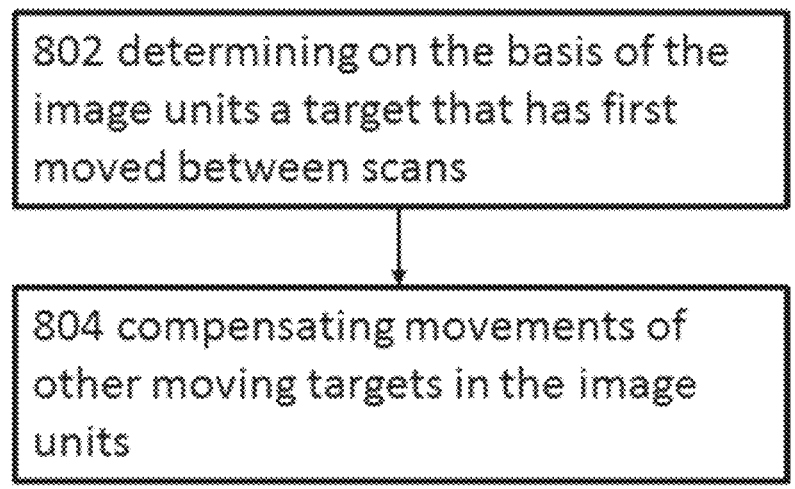
FIG. 8 illustrates a method for compensating interrelated movement of targets within the field of view in accordance with at least some embodiments of the present invention.

FIG. 8 illustrates a method for compensating interrelated movement of targets within the field of view in accordance with at least some embodiments of the present invention. The compensation provides that movement of targets that have moved by one or more other moving targets may be compensated. The method may be performed by the multichannel radar or one or more processing units connected to the multichannel radar described with FIG. 1 for example in connection with phase 708 in FIG. 7.

Phase 802 comprises determining on the basis of the image units a target that has first moved between scans. Phase 804 comprises compensating movements of other moving targets in the image units. Accordingly, only the movement of the other moving targets are compensated in scanning results, whereby a radar image generated on the basis of the compensated scanning results illustrates the movement of the target that moved first. It should be appreciated that in one example movements of other moving targets in the image units may be compensated by neglecting image units that correspond to the target that moved first. The compensation of the movement may be performed as described with phase 708 of FIG. 7.

The first moved target may be regarded an initiator of the movements of the other targets in the field of view. Accordingly, the other targets may not be moving independently but by a movement of the initiator which is communicated to the other targets and causes their movement. In an example first moved target may initiate the movements of the other targets, when the targets are people sleeping on a bed. Then a movement of on target may be communicated by a mattress to the other targets on the bed. Accordingly, the other targets are not moved, whereby their movement is compensated to avoid erroneous detection of their movement.

An embodiment comprises a non-transitory computer readable medium having stored thereon a set of computer readable instructions that, when executed by a multichannel radar or at least one processor connected to a multichannel radar, cause the multichannel radar or the one processor and the multichannel radar to at least: scanning a field of view within a frequency range from 1 to 1000 GHz, for example between 1 to 30 GHz, 10 to 30 GHz, 30 to 300 GHz or 300 to 1000 GHz, using a plurality of radar channels of the radar; generating a radar image on the basis of results of the scanning, wherein the radar image comprises image units comprising at least amplitude and phase information; identifying from the radar image separate sets of image units on the basis of the amplitude and/or phase information of the image units; and determining a presence of moving targets within the field of view of the radar on the basis of phase and/or amplitude changes of the image units between scans.

An embodiment comprises a non-transitory computer readable medium having stored thereon a set of computer readable instructions that, when executed by a multichannel radar or at least one processor connected to a multichannel radar, cause the multichannel radar or the one processor and the multichannel radar to at least: scanning a field of view within a frequency range from 1 to 1000 GHz, for example between 1 to 30 GHz, 10 to 30 GHz, 30 to 300 GHz or 300 to 1000 GHz, using a plurality of radar channels of the radar, generating image units for a radar image on the basis of results of the scanning, wherein the image units comprise at least amplitude and phase information, determining on the basis of the image units information indicating at least one error source of a physical movement of the radar and interrelated movements of targets within the field of view, compensating results of the scanning on the basis of the determined error source; and generating a radar image on the basis of the compensated results.

An embodiment comprises a computer program configured to cause a method in accordance with at least some embodiments described herein. The computer program may comprise executable code that may be executed by a processing unit for causing the embodiments.

It is to be understood that the embodiments of the invention disclosed are not limited to the particular structures, process steps, or materials disclosed herein, but are extended to equivalents thereof as would be recognized by those ordinarily skilled in the relevant arts. It should also be understood that terminology employed herein is used for the purpose of describing particular embodiments only and is not intended to be limiting.

Reference throughout this specification to "one embodiment" or "an embodiment" means that a particular feature, structure, or characteristic described in connection with the embodiment is included in at least one embodiment of the present invention. Thus, appearances of the phrases "in one embodiment" or "in an embodiment" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present invention may be referred to herein along with alternatives for the various components thereof. It is understood that such embodiments, examples, and alternatives are not to be construed as de facto equivalents of one another, but are to be considered as separate and autonomous representations of the present invention.

Furthermore, the described features, structures, or characteristics may be combined in any suitable manner in one or more embodiments. In the following description, numerous specific details are provided, such as examples of lengths, widths, shapes, etc., to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

While the foregoing examples are illustrative of the principles of the present invention in one or more particular applications, it will be apparent to those of ordinary skill in the art that numerous modifications in form, usage and details of implementation can be made without the exercise of inventive faculty, and without departing from the principles and concepts of the invention. Accordingly, it is not intended that the invention be limited, except as by the claims set forth below.

The verbs "to comprise" and "to include" are used in this document as open limitations that neither exclude nor require the existence of also un-recited features. The features recited in depending claims are mutually freely combinable unless otherwise explicitly stated. Furthermore, it is to be understood that the use of "a" or "an", i.e. a singular form, throughout this document does not exclude a plurality.

ACRONYMS LIST

2D Two Dimensional
3D Three Dimensional
FFT Fast Fourier Transform
MIMO Multiple Input Multiple Output
MISO Multiple Input Single Output
SIMO Single Input Multiple Output
UWB Ultra-WideBand

REFERENCE SIGNS LIST 102 field of view
104 multichannel radar
106 transmitting antennas
108 receiving antennas
110 targets
112 processing unit
114 user interface
116 artificial intelligence system
118 accelerometer
120 gyroscope
202 to 210 Phases of FIG. 2A
212 to 218 Phases of FIG. 2B
302 amplitude plot
304, 306 phase plot
402 amplitude plot
404, 406 phase plot
502 to 512 Phases of FIG. 5
602 to 608 Phases of FIG. 6
702 to 708 Phases of FIG. 7
802, 804 Phases of FIG. 8

The invention claimed is:

1. A method for monitoring living facilities by a multi-channel radar, comprising:
scanning, by a multichannel radar or at least one processing unit connected to the radar, a field of view within a frequency range from 1 to 1000 GHz, using a plurality of radar channels of the radar;
generating, by the radar or the processing unit connected to the radar, image units for a radar image on the basis of results of the scanning, wherein the image units comprise at least amplitude and phase information;
determining, by the radar or the processing unit connected to the radar, on the basis of the image units information indicating at least one error source of a physical movement of the radar and interrelated movements of targets within the field of view;
compensating, by the radar or the processing unit connected to the radar, results of the scanning on the basis of the determined error source;
generating, by the radar or the processing unit connected to the radar, a radar image on the basis of the compensated results;
determining a number of moving targets, on the basis of the number of separate sets of the image units identified from the radar image; and
entering the radar to a power saving mode, when the number of moving targets is one or less, wherein the power saving mode comprises that the radar is controlled to scan the field of view using a reduced number of radar channels.

2. The method according to claim 1, further comprising:
identifying from the radar image, by the radar or the processing unit connected to the radar, separate sets of image units on the basis of the amplitude and/or phase information of the image units; and
determining, by the radar or the processing unit connected to the radar, a presence of moving targets within the field of view of the radar on the basis of phase and/or amplitude changes of the image units between scans.

3. The method according to claim 1, wherein the physical movement of the radar is determined on the basis of changes of image units corresponding to non-moving targets between scans, accelerometer data and gyroscope data.

4. The method according to claim 1, wherein compensating the interrelated movements of moving targets comprise:
determining on the basis of the image units a target that has first moved between scans; and
compensating movements of other moving targets in the image units.

5. The method according to claim 1, wherein a time interval between the scans is reduced or increased, when the power saving mode is entered.

6. The method according to claim 1, wherein the radar is triggered to leave the power saving mode after a time interval has passed and/or on the basis of a trigger signal.

7. The method according to claim 1, wherein in the power saving mode change patterns of the image units corresponding to micro movements such as at least one of heart rate and breathing are determined.

8. The method according to claim 1, wherein the field of view is within a frequency range from 1 to 30 GHz, 10 to 30 GHz, 30 to 300 GHz or 300 to 1000 GHz.

9. The method according to claim 1, wherein the field of view is within a frequency range from 10 to 30 GHz.

10. The method according to claim 1, wherein the field of view is within a frequency range from 30 to 300 GHz.

11. The method according to claim 1, wherein the field of view is within a frequency range from 300 to 1000 GHz.

12. A multichannel radar for monitoring living facilities, comprising:
a radar transceiver configured to scan a field of view within a frequency range from 1 to 1000 GHz, using a plurality of radar channels of the radar;
a processor configured to generate image units for a radar image on the basis of results of the scanning, wherein the image units comprise at least amplitude and phase information;
the processor further configured to determine on the basis of the image units information indicating at least one error source of a physical movement of the radar and interrelated movements of targets within the field of view;
the processor further configured to compensate results of the scanning on the basis of the determined error source; and
the processor further configured to generate a radar image on the basis of the compensated results and to:
determine a number of moving targets, on the basis of the number of separate sets of the image units identified from the radar image; and
enter the radar to a power saving mode, when the number of moving targets is one or less, wherein the power saving mode comprises that the radar is controlled to scan the field of view using a reduced number of radar channels.

13. The multichannel radar according to claim 12, further configured to display at least one of the generated radar image, information indicating the number of moving targets, types of the moving targets, information indicating heart rate, information indicating breathing and information indicating a presence of error source.

14. The multichannel radar according to claim 13, wherein multichannel radar is configured to:

obtain, by a user interface, user input to cause at least one of switching off compensation of the scanning results; and
obtain, by the user interface, user input for training an artificial intelligence system operatively connected to the radar and the processing unit to the compensated results.

15. The multichannel radar according to claim 12, wherein the field of view is within a frequency range from 1 to 30 GHz, 10 to 30 GHz, 30 to 300 GHz or 300 to 1000 GHz.

16. The multichannel radar according to claim 12, wherein the field of view is within a frequency range from 10 to 30 GHz.

17. The multichannel radar according to claim 12, wherein the field of view is within a frequency range from 30 to 300 GHz.

18. The multichannel radar according to claim 12, wherein the field of view is within a frequency range from 300 to 1000 GHz.

19. A non-transitory computer readable medium having stored thereon a set of computer readable instructions that, when executed by at least one processor, cause an apparatus to at least
scan, by a multichannel radar or at least one processing unit connected to the radar, a field of view within a frequency range from 1 to 1000 GHz, using a plurality of radar channels of the radar;
generate, by the radar or the processing unit connected to the radar, image units for a radar image on the basis of results of the scanning, wherein the image units comprise at least amplitude and phase information;
determine, by the radar or the processing unit connected to the radar, on the basis of the image units information indicating at least one error source of a physical movement of the radar and interrelated movements of targets within the field of view;
compensate, by the radar or the processing unit connected to the radar, results of the scanning on the basis of the determined error source;
generate, by the radar or the processing unit connected to the radar, a radar image on the basis of the compensated results;
determine a number of moving targets, on the basis of the number of separate sets of the image units identified from the radar image; and
enter the radar to a power saving mode, when the number of moving targets is one or less, wherein the power saving mode comprises that the radar is controlled to scan the field of view using a reduced number of radar channels.

* * * * *